(12) United States Patent
Blanc et al.

(10) Patent No.: US 6,505,544 B1
(45) Date of Patent: Jan. 14, 2003

(54) COFFEE EXTRACTING DEVICE

(75) Inventors: Jean-Pierre Blanc, Nice (FR); Christian Ferrier, Nice (FR)

(73) Assignee: Compagnie Mediterraneenne des Cafes, Carros (FR)

( * ) Notice: Subject to any disclaimer, the term of this patent is extended or adjusted under 35 U.S.C. 154(b) by 0 days.

(21) Appl. No.: 09/890,332

(22) PCT Filed: Jan. 24, 2000

(86) PCT No.: PCT/FR00/00147

§ 371 (c)(1),
(2), (4) Date: Jul. 30, 2001

(87) PCT Pub. No.: WO00/44268

PCT Pub. Date: Aug. 3, 2000

(30) Foreign Application Priority Data

Jan. 28, 1999 (FR) ............................................ 99 00995

(51) Int. Cl.⁷ ................................................. A47J 31/40
(52) U.S. Cl. ...................................... 99/289 R; 99/295
(58) Field of Search ............................... 99/289 R, 295, 99/302 R, 302 P

(56) References Cited

FOREIGN PATENT DOCUMENTS

| EP | 0 867 142 | 9/1998 |
|----|-----------|--------|
| WO | WO 95/07041 | 3/1995 |
| WO | WO 95/17121 | 6/1995 |

*Primary Examiner*—Reginald L. Alexander
(74) *Attorney, Agent, or Firm*—Young & Thompson

(57) ABSTRACT

Device for the extraction of coffee, includes an extraction chamber supplied by the vertical introduction of tablets or premeasured small quantities of ground coffee. The extraction chamber includes two movable portions for horizontal movement so as to move toward or away from each other, one of the movable portions including a hot water inlet, the other having a coffee extract outlet. The movable portions are each mounted on an eccentric shaft adapted to transmit to them oscillatory movements of opposite directions. A braked pivotal connection between each eccentric shaft and each movable portion, combines a horizontal movement and an oscillatory movement for sequencing the phases of opening and closing the extraction chamber. The device is useful in coffee machines of the espresso type usable with tablets or premeasured small quantities.

12 Claims, 5 Drawing Sheets

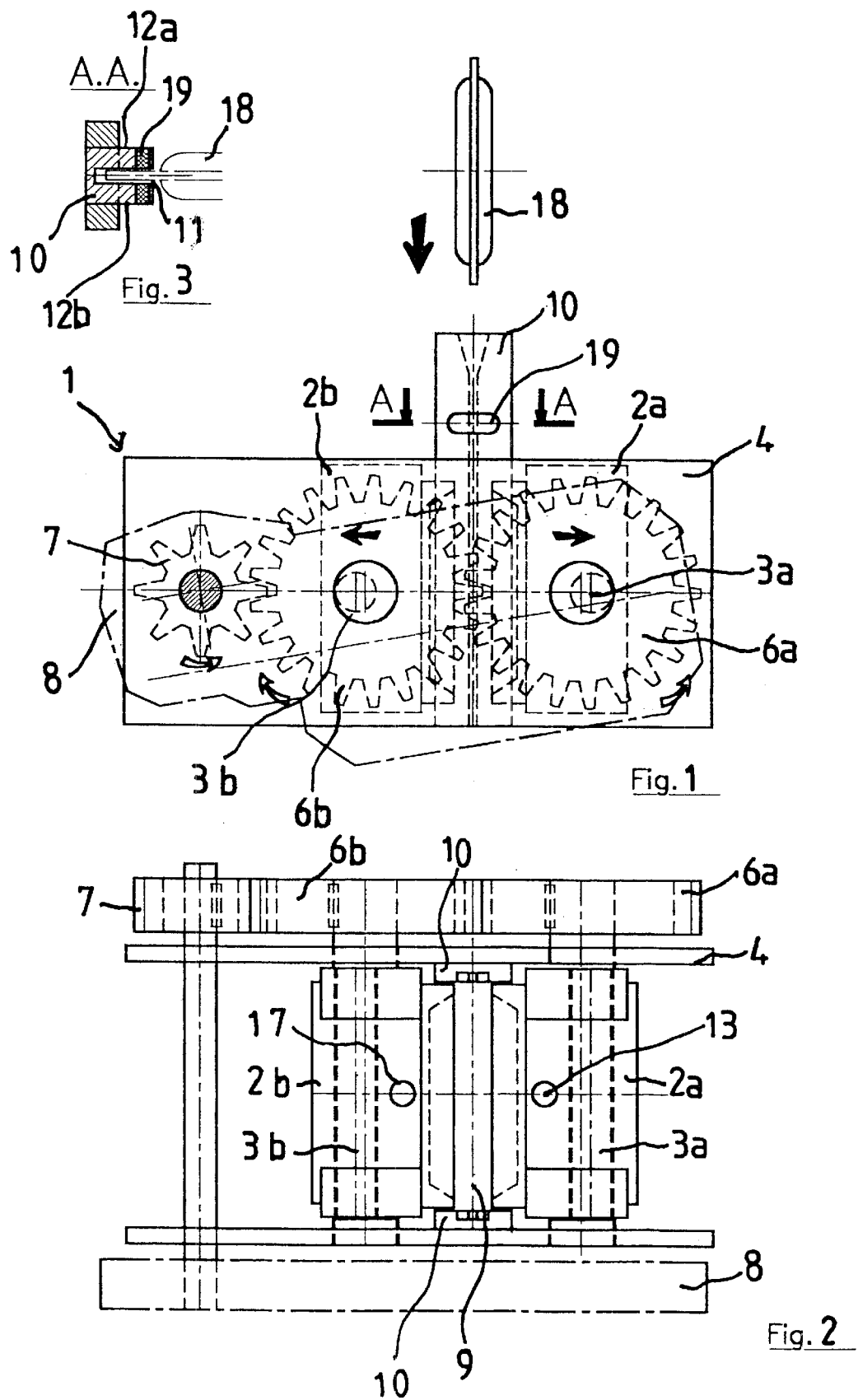

COFFEE EXTRACTING DEVICE

CROSS REFERENCE TO RELATED APPLICATION

This is the 35 U.S.C. § 371 national stage of international application PCT/FR00/00147 filed on Jan. 24, 2000, which designated the United States of America.

FIELD OF THE INVENTION

The present invention relates to a device for extracting coffee. This device is of the type comprising an extraction chamber to be fed by vertical introduction of tablets or premeasured small quantities of ground coffee.

The invention particularly finds its application in the field of the production and use of machines for the preparation of beverages of the type of espresso coffee. More particularly, the invention relates to machines using tablets or premeasured small quantities of ground coffee.

In this field, there are already known machines permitting the extraction of coffee by simple introduction of small quantities or tablets by the user.

Patent application WO-A-9507041 discloses an espresso coffee machine, comprised conventionally by a boiler and a jack, itself comprised by a cylindrical body enclosing a piston using tablets of coffee or the like. It is constituted by abutments placed at one end of the boiler in a perpendicular position relative to the longitudinal axis of the espresso coffee machine, the jack coacting with said boiler at the level of the abutments to fix in position a coffee tablet or the like which is fixed by its member between the abutments, on the one hand, and the boiler on the other hand.

There is also known from patent application WO-A95/17121 an automatic machine for the preparation of infusions of hot beverages such as coffee, which comprises a group formed by a body placed facing a boiler, adapted to be brought toward each other to form an infusion chamber.

It comprises, between the body and the boiler, at the level of the infusion chamber:
- means for receiving an individual package containing the product to be infused, which are constituted by at least one retractable element, extended in substantially lower position, adapted temporarily to immobilize said package between the body and the boiler,
- means for holding in position the package which are constituted by two lateral substantially vertical grooves, in which said package slides and is held in vertical position when the receiving means are present, and
- automatic ejection means for said package which are constituted by the retractable element which is retracted relative to the passage of the individual package, to permit the ejection by simple gravity of the individual package, the movement of the individual package being perpendicular to the axis of the machine.

There is also known from the document EP-A-0867142 an espresso coffee machine which uses filtering capsules and which has an infusion unit comprising two portions of the infusion chamber which slide relative to each other between an open and a closed position.

These machines, resulting from the work of the applicant, permit using premeasured small quantities or tablets of ground coffee integrated into an extraction chamber (which is to say in which there is carried out the extraction of the coffee). According to the state of the art, the extraction chamber is comprised by two elements movable in horizontal translation so as to move toward or away from each other to open or close the extraction chamber.

Although interesting, such machines do not give complete satisfaction.

In the first place, they have the drawback of being of a relatively complicated design. Thus, they require the use of a system for movement, which is heavy and costly (particularly as to the bias of the jacks). It also requires the use of means adapted to be perfectly adjusted to carry out very precise movements of the two movable portions constituting the chamber.

As a result, the present machines have a size which should be substantially reduced. Moreover, their design is complicated, which leads to high production costs.

OBJECTS OF THE INVENTION

The object of the present invention is to overcome such drawbacks by providing a lighter design permitting particularly the mobility of the two elements comprising the extraction chamber without giving rise to the use of heavy and costly movement means.

One of the advantages of the invention is to provide a device using simple drive means comprising a low powered motor and not giving rise to particular problems as to adjustment in position of the movements to be carried out.

Another advantage of the invention is to combine, from a single motor or other drive system, a mobility not only in translation but also in oscillation of the two portions comprising the extraction chamber.

Another object of the device for the extraction of coffee permits more flexibility of use, the replacement or repair of the device. To do this, it has the advantage of comprising easily disassembleable elements such as a screen door or a filter door adapted to be easily replaced.

Another object of the invention is to permit the emplacement and optimum guidance of the tablet or premeasured small quantity of ground coffee during its steps of use.

Other objects and advantages will become apparent from the description which follows, which is however given only by way of example.

SUMMARY OF THE INVENTION

The present invention relates to a device for the extraction of coffee, comprising an extraction chamber of the type that is supplied by vertical introduction of tablets or premeasured small quantities of ground coffee, said extraction chamber being comprised of two portions movable horizontally toward and away from each other, one of the movable portions comprising a hot water inlet, the other movable portion being provided with an outlet for coffee extract, characterized by the fact that
  the movable portions are each mounted on an eccentric shaft adapted to transmit to them oscillatory movements in opposite directions,
  and that it comprises a braked pivot connection between each shaft with an eccentric and each movable portion, so as to combine a horizontal movement and an oscillatory movement for sequencing the phases of opening and closing the extraction chamber.

The device could be made according to particular different modes and particularly those set forth hereafter.

Abutment surfaces on which the movable portions come into bearing, permit limiting the angle of oscillation of it.

Guide means of the tablet are present for maintaining it substantially vertical.

The guide means also constitute the abutment surfaces.

The guide means are formed by two vertical grooved elements to coact with the periphery of the tablet and positioned on opposite sides of the movable portion substantially at the level of their plane of contact.

The pivot connection is braked by a friction shoe carried by each movable portion and bearing resiliently on the periphery of the shaft.

The abutment surfaces give rise to the relative movement of the movable portion and the shaft with an eccentric of the braked pivot connection so as to cause the movable portions to come together when they have reached their maximum angular displacement.

The eccentric shafts are moved by engaging and motor driven toothed wheels, adapted to transmit to the movable portions movements symmetrical relative to their plane of contact.

The movable portions each comprise a movable support mounted on the eccentric shaft and, one has a screen door and the other has a filter door, retractable and mounted on the movable support.

The device comprises at least one position detector adapted to determine the angular position of the toothed wheels.

It comprises at least one detector for the presence of a tablet in loading position.

Starting from a maximum angular position in which the extraction chambers open downwardly, the eccentric shafts carry out an angular movement permitting the opening of the extraction chamber upwardly for the introduction of a tablet, the eccentric shafts pursue their angular movement for closing the extraction chamber, then carry out an angular movement in an opposite direction to bring the extraction chamber to a downwardly open position for discharge of the used tablet and to await the loading of a new tablet.

BRIEF DESCRIPTION OF THE DRAWINGS

The accompanying drawings are given by way of example and are not limiting. They show an embodiment according to the invention. They permit easy comprehension of the invention.

FIG. 1 is an assembly view of the device according to the invention, seen from the side.

FIG. 2 is a top plan view of the embodiment of FIG. 1.

FIG. 3 shows an embodiment of guide means.

DETAILED DESCRIPTION OF THE INVENTION

Figure 4:
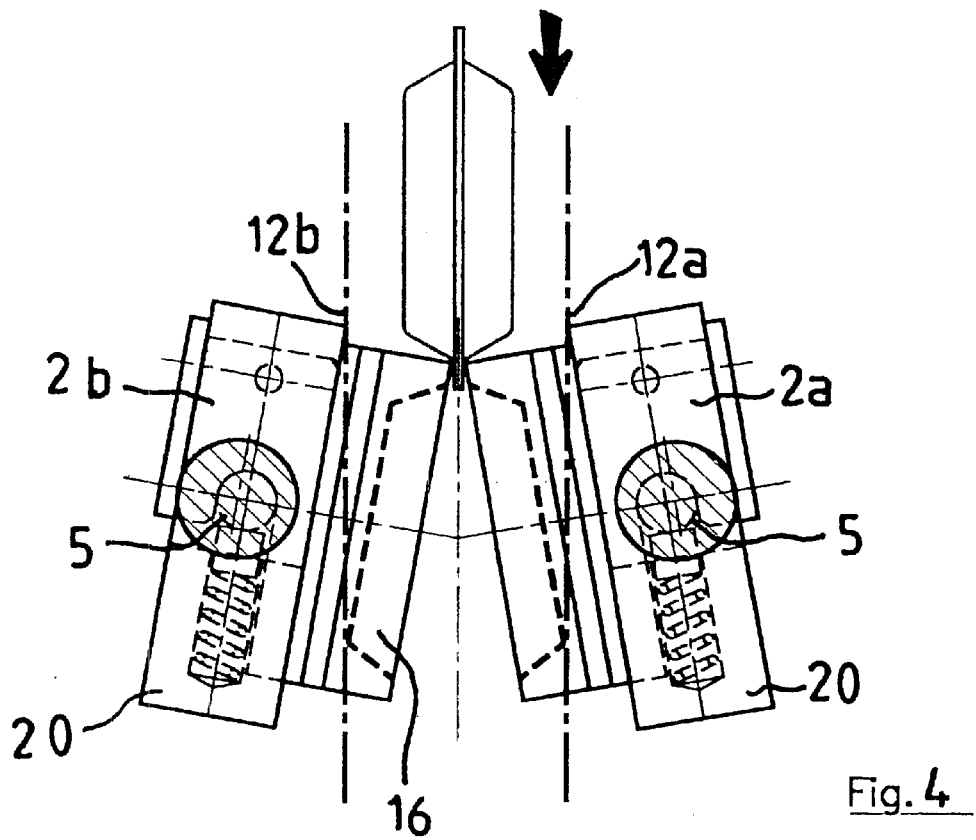
FIGS. 4 to 9 show several successive phases of positioning of the invention.

The device 1 for the extraction of coffee in this case can be integrated into a machine of the espresso type using tablets or premeasured small quantities. Particularly, such a machine will comprise existing elements such as a boiler or else a supply and a casing.

The invention is particularly adapted for machines using tablets or premeasured small quantities of ground coffee such as shown in FIG. 1 with reference 18.

More particularly, there can be used, without limitation, small quantities comprising a periphery that is reinforced or else rigidified as known from patent application PCT/WO9507041.

As can also be seen from FIG. 1, the device 1 for the extraction of coffee permits the introduction of tablets or small quantities 18, from above the device 1.

The device 1 according to the invention comprises an extraction chamber 16 which is the volume in which the small quantity 18 is temporarily enclosed so as to carry out its forced extraction.

Figure 7:
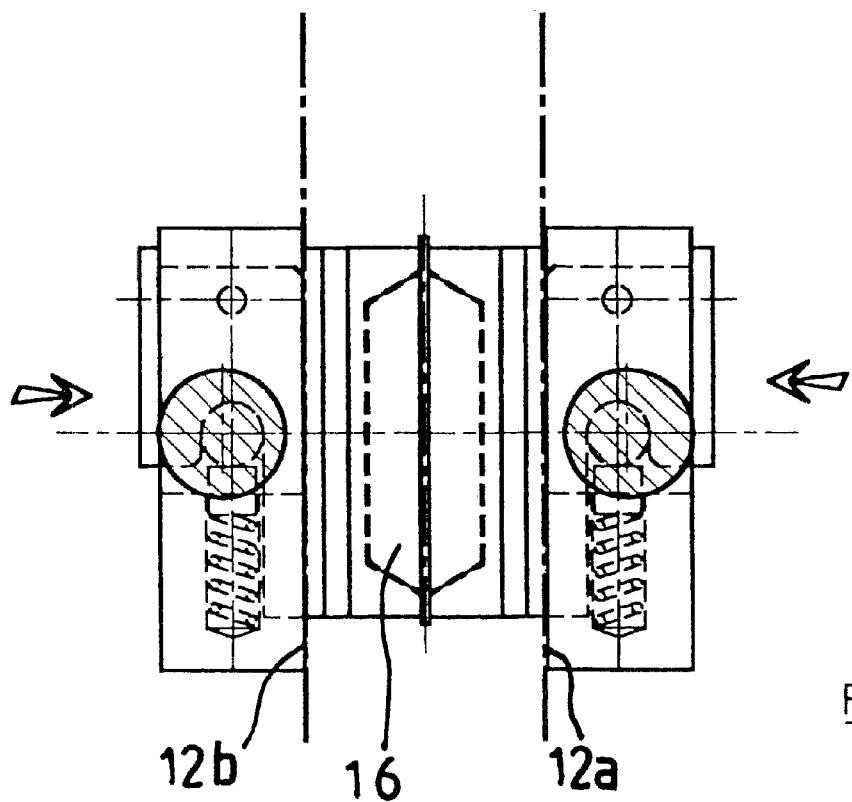

The extraction chamber 16 as shown in FIGS. 4 and 7 is comprised by two movable portions 2a and 2b.

One of these movable portions 2a comprises a hot water inlet indicated at 13. The other movable portion comprises a coffee outlet 17. This is schematically shown in FIG. 1.

To apply hot water to the small quantity 18, the movable portion 2a will moreover comprise a screen shown in a particular embodiment in FIG. 1 with reference 21. Similarly, to permit the evacuation of the beverage or coffee that is produced, the movable portion 2b will comprise a filter portion (not shown).

Figure 5:
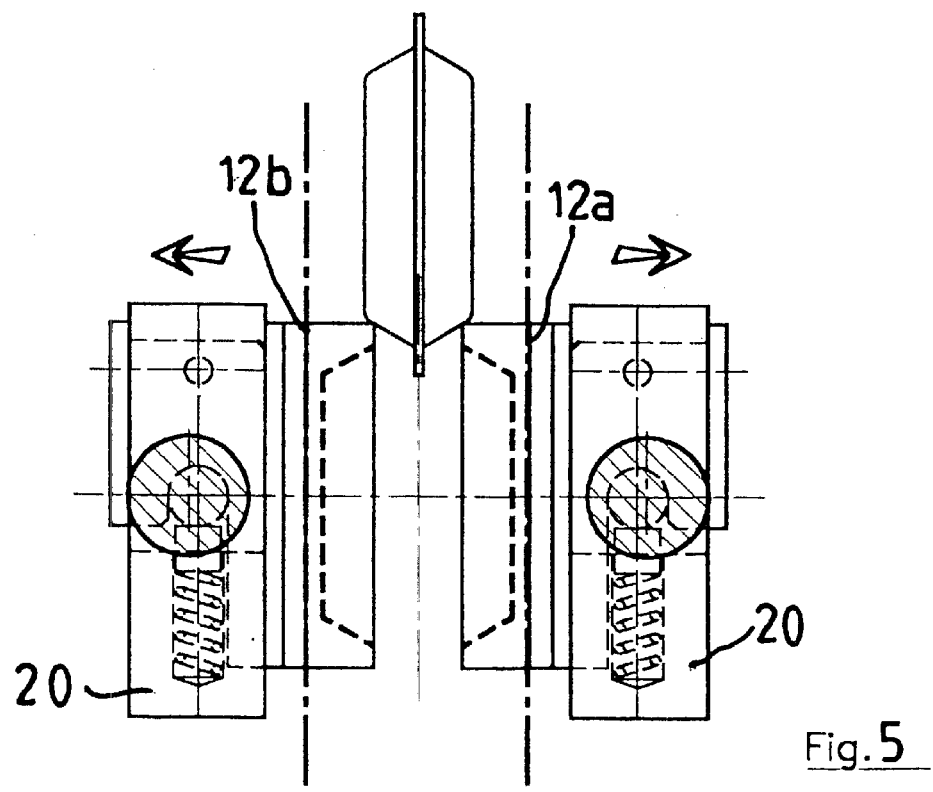
Figure 6:
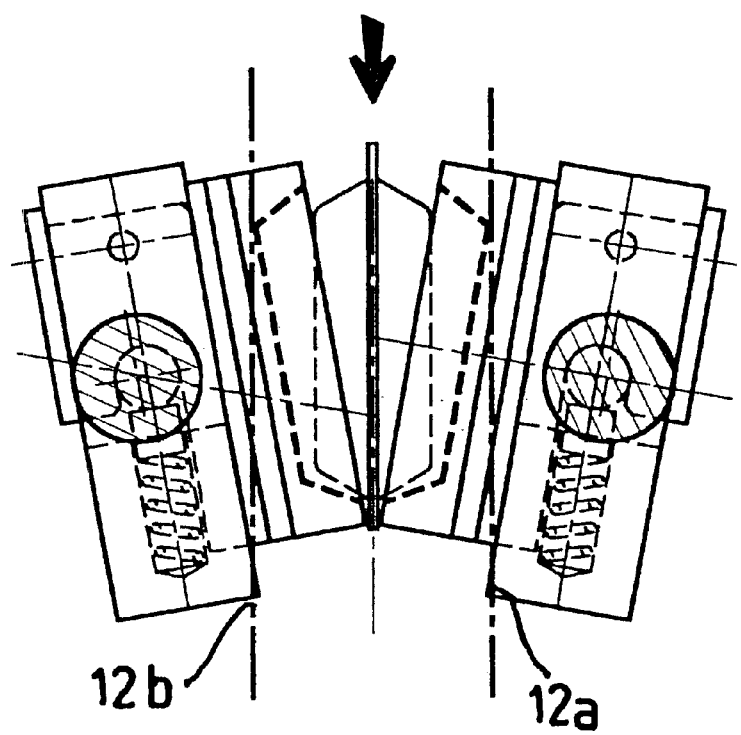
Figure 8:
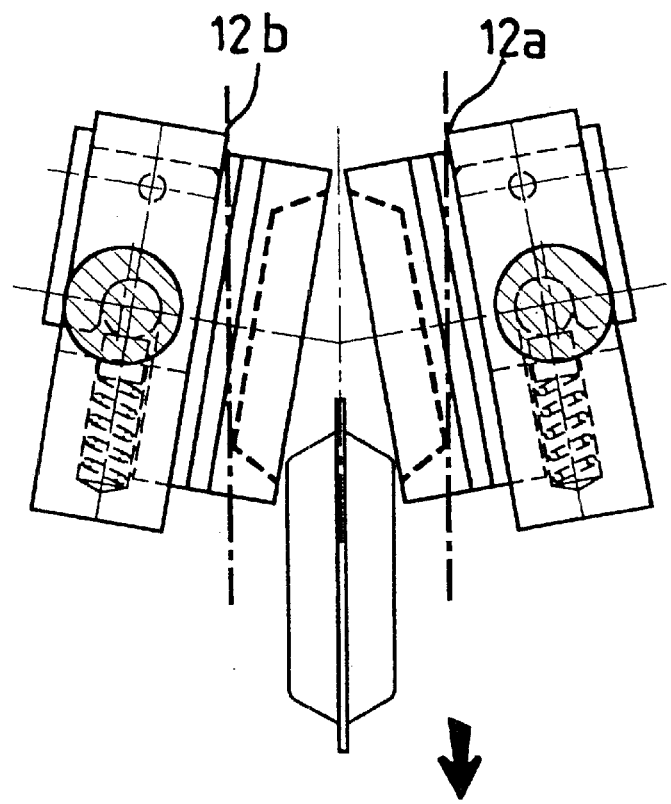

The extraction chamber 16 can have several configurations to permit the phases of production of coffee. Thus, there can be distinguished the phase of loading the small quantity 18 in the course of which the latter is introduced into the internal volume of the extraction chamber 16. This phase is shown in FIGS. 5 and 6. There follows a phase of closing the extraction chamber 16, permitting enclosing in sealed manner the small quantity 18 to proceed with the extraction of the coffee. This is shown in FIG. 7. Finally, the extraction chamber is opened downwardly which is necessary to cause evacuation of the used small quantity 18 and to permit receiving a new tablet 18 from above the device 1. This discharge is shown in FIG. 8.

So that the extraction chamber 16 can pass from one configuration to the other, there is utilized according to the invention movable portions 2a, 2b adapted to carry out movement not only horizontally to move toward or away from each other, but also in an oscillating manner.

In this way, there are combined two movements (a horizontal movement and an oscillating movement) and, preferably, these two movements are carried out by a single motor drive.

To carry out a combination of an oscillating movement and a horizontal translatory movement, the movable portions 2a and 2b which comprise the device 1 have the following characteristics.

On the one hand, the movable portions 2a and 2b are each mounted on an eccentric shaft 3a, 3b, as shown in FIG. 1 and in FIG. 2 from above.

The shafts 3a, 3b permit the transmission of oscillatory movement to the two movable portions 2a, 2b. As shown in FIG. 1 by the arrows, in each case, the transmission of the movements takes place in opposite direction for each of the movable portions 2a, 2b. Preferably, the movements of the movable portions 2a, 2b are symmetrical relative to their plane of contact 9, when the extraction chamber 16 is in the closed position.

The plane of contact 9 is a vertical plane appearing in the plan view of FIG. 2 as shown by broken lines.

In the particular embodiment shown in the figures, the eccentric shafts 3a, 3b drive the movable portions 2a, 2b with pivotal movement relative to the frame 4 of the device. This frame 4 is shown in the figures in the form of vertical walls surrounding the constituent elements of the device 1, but this arrangement of the frame 4 is not limiting.

In addition to the rotative movement thus achieved, the movable portions 2a, 2b should move toward or away from each other according to the phases of the arrangement of the extraction chamber 16.

Figure 12:
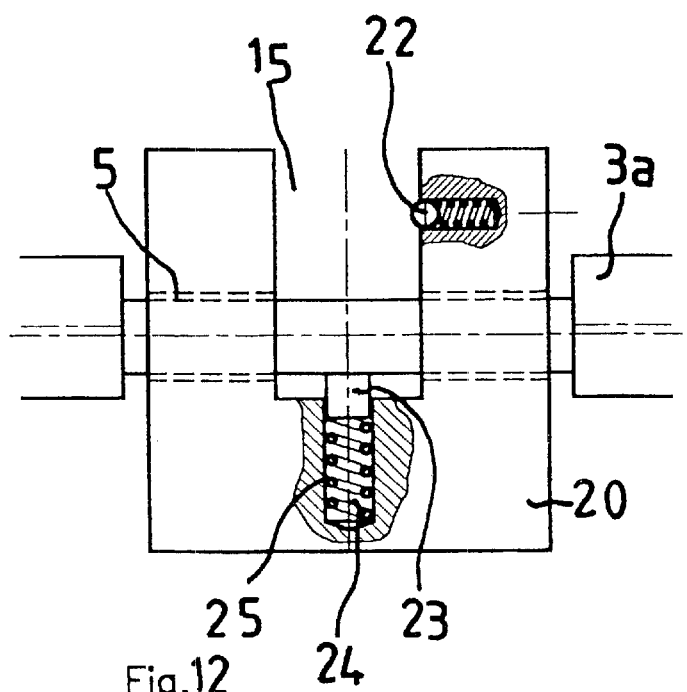
FIGS. 12 and 13 show the braked pivotal connection in a preferred embodiment.
Figure 13:
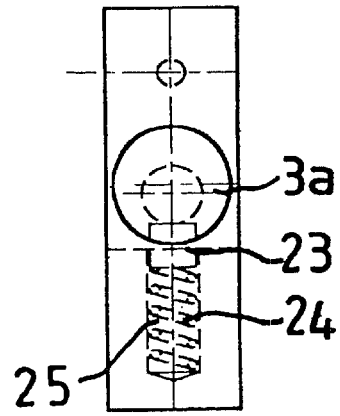

To carry out this horizontal movement, the device 1 for the extraction of coffee according to the invention comprises a braked pivotal connection 5. This pivotal connection 5 as shown in FIGS. 4 and 12 is present between each eccentric shaft 3a, 3b and each movable portion 2a, 2b.

According to the invention, the pivot connection 5 is braked in the sense that there exists a resistance to the relative pivotal movement between the eccentric shaft 3a, 3b and the movable portion 2a, 2b. Thus, the relative pivotal movement does not take place unless the imposed resistance is overcome.

In this way, there can be distinguished two particular cases for the operation of this pivot connection 5.

In the first case, the oscillatory movement caused by the eccentric shafts 3a, 3b is not angularly limited. In this case, only the oscillation takes place given that no force permits opposing the brake provided by the pivotal connection 5.

In the second case, the oscillatory movement induced by the eccentric shafts 3a, 3b can be blocked, for example when the two movable portions 2a, 2b are in angular abutment with each other or against a mechanical member, as described later.

In this framework, the braked pivotal connection 5 can thus operate. It will be seen that in this case there is a moving together or apart of the movable portions 2a, 2b by the bias of the eccentric.

As indicated above, there could be used similar means for moving the two movable portions 2a, 2b. In this way, the movements that are generated will be completely symmetrical relative to the junction plane of the two movable portions 2a, 2b. However, the direction of their movement would be opposite.

In a particular embodiment, the device comprises abutment surfaces 12a, 12b. The abutment surfaces permit limiting the angle of oscillation of the movable portions 2a, 2b which come to bear against the surfaces 12a, 12b as shown in FIGS. 4 to 9.

In a particular embodiment, the abutment surfaces 12a, 12b can be carried by or constituted by the frame 4. They permit limitation of the oscillation of the movable portions 2a, 2b so as to form either a downward opening of the extraction chamber 16, or an upward opening of the chamber 16.

In a particular embodiment, the device has guide means 10 for the small quantity 18 to hold it substantially in vertical position.

Guide means 10 can also be used to constitute in the same piece the abutment surfaces 12a, 12b.

In this connection, guide means 10 can be provided as shown in FIGS. 1 and 3. In these figures, thus, the guide means 10 are constituted by vertically grooved elements to coact with the peripheral portion of the small quantity 18. This embodiment is for use with small quantities 18 comprising a reinforced or rigidified periphery. This reinforced periphery can thus be inserted into the groove 11 as shown in FIG. 3. There could be used grooved elements forming guide means 10 positioned on opposite sides of the movable portions 2a, 2b substantially at the level of their contact plane.

Two grooved elements are shown in FIG. 2 by reference 10. FIG. 3 moreover shows that the movable portions 2a, 2b come to bear against portions of the grooved element; said portions constituting abutment surfaces 12a, 12b.

To make the braked pivot connection 5, there can be used a friction pad 23 carried by each movable portion 2a, 2b. As shown in FIG. 12, the friction pad 23 bears resiliently against the periphery of the eccentric shaft 3a, 3b.

To provide the resilient bearing, there can be used, as shown in FIG. 12, a spring 24 and a spring cage 25 permitting resilient bearing on the friction pad 23.

Of course, the stiffness of the spring 24 will be selected to be compatible with the resistance that can overcome the motor drive but also to avoid any parasitic movement relative to the eccentric shaft 3a, 3b and the movable portions 2a, 2b during purely oscillatory movements.

To move the movable portions 2a, 2b, there will preferably be used toothed wheels 6a, 6b that engage with each other. As shown in FIG. 1, these toothed wheels 6a, 6b can be rotated by a motor 8 via a gear train 7. There will be used a motor 8 of a known type and particularly an electric motor.

The choice of the dimensions 6a, 6b and the gearing 7 will be a function of the speed of movement of oscillation to be obtained starting with the nominal angular speed of the motor 8.

The use of toothed wheels 6a, 6b that engage has the advantage of easily creating a perfectly symmetrical start-up of the two movable portions 2a, 2b.

To permit good sequencing of the phases of opening and closing the extraction chamber 16, there will preferably be used at least one detector for the position of the angular movement of the toothed wheels 6a, 6b. There can also be sequenced, automatically, the phases of movement as a function of the angular position that is achieved.

For another particular embodiment, the device 1 comprises at least one detector 19 for the presence of a tablet or small dose 18 in the loading position. Such a presence detector, particularly constituted by a photoelectric cell, can be positioned as shown in FIGS. 1 and 3. The introduction of a small quantity 18 in the ready position to carry out the phases of loading, coffee extraction and evacuation of the small quantity 18.

In the particular embodiment shown in the figures, the movable portions 2a, 2b are constituted by two principal members.

On the one hand, they comprise a movable support shown at 20 in the drawings. The support 20 is the element directly coacting with the eccentric shaft 3a, 3b. It is therefore this which drives the rest of the elements constituting the movable portion 2a, 2b with its oscillatory movement and movement of horizontal displacement.

Each movable portion 2a, 2b comprises moreover in this embodiment a retractable member adapted to be mounted on the movable support 20. For the movable portion 2a comprising the water inlet 13, this retractable member is a screen door 21. For the movable portion 2b comprising an outlet for coffee 17, the retractable member is constituted by a filter door.

As shown in FIGS. 10 to 13 in greater detail, the filter door or the screen door 21 can be inserted on the movable support 20 at the level of a recess 15 constituted on it.

Moreover, pressure means 22 such as a bearing rod mounted on a spring can be used to reinforce the connection of the screen door or the filter door on the movable support 20.

Other mounting modes are however within the scope of the invention.

There will be given hereafter an example of the movements carried out by the movable portions 2a, 2b in the different conditions of configuration of the extraction chamber 16.

As shown in FIG. 4, one starts from a downwardly open position of the extraction chamber 16. In this way, the preceding discharge of a small quantity 18 can be carried out as well as the placing in a ready position of a small quantity 18 introduced vertically from above the device.

During this introduction of the small quantity 18, the presence detector 19 is activated to sequence the phases of movements of the movable portions 2a, 2b.

The presence information starts the motor 8, permitting by the bias of the eccentric shafts 3a, 3b carrying out an oscillatory movement of the movable portions 2a, 2b so as to bring the extraction chamber 16 into the upwardly open position as shown in FIG. 6. An intermediate phase is also shown in FIG. 5. This phase of pure oscillation ends when the movable portions 2a, 2b come into abutment against the abutment surfaces which are indicated at 12a, 12b.

During this stage, the small quantity 18, particularly by mere gravity, enters the extraction chamber 16. The abutment surfaces 12a, 12b thus effect a limitation of the angular displacement. The power of the motor thus permits opposing the resistance of the brake of the pivot connection 5. There results a movement of the eccentric shaft 3a, 3b relative to the movable portions 2a, 2b so as to modify the position of the eccentric. As shown in FIG. 5, the eccentric 3a, 3b passes from a position in which the movable portions are spaced a maximum, to a position in which they are brought together to the maximum as in FIG. 7. This approach phase takes place in this case by rotation of the motor from the ready phase for loading a small quantity 18 as shown in FIG. 1, to the closing phase of the extraction chamber 16 as shown in FIG. 3.

It is to be noted that the movements thus carried out take place in a continuous manner by means of a single motor.

The extraction chamber 16 is then in closed position, as in FIG. 7, which permits operation of forced flushing or extraction of the coffee. A position detector permits determining the end of closure of the extraction chamber 16 to start the extraction operation.

When this extraction is completed, the motor 8 is actuated in the reverse direction of the preceding phases, to proceed to open the extraction chamber 16 downwardly. This opening phase can begin with a purely oscillatory movement until the movable portions 2a, 2b come, by their upper portion, into abutment against the abutment surfaces 12a, 12b. There then follows a reverse movement of the eccentric shaft 3a, 3b relative to the closing phase. Finally, the movable portions 2a, 2b are returned to their initial arrangement, namely awaiting the vertical introduction of a small quantity 18.

Figure 9:
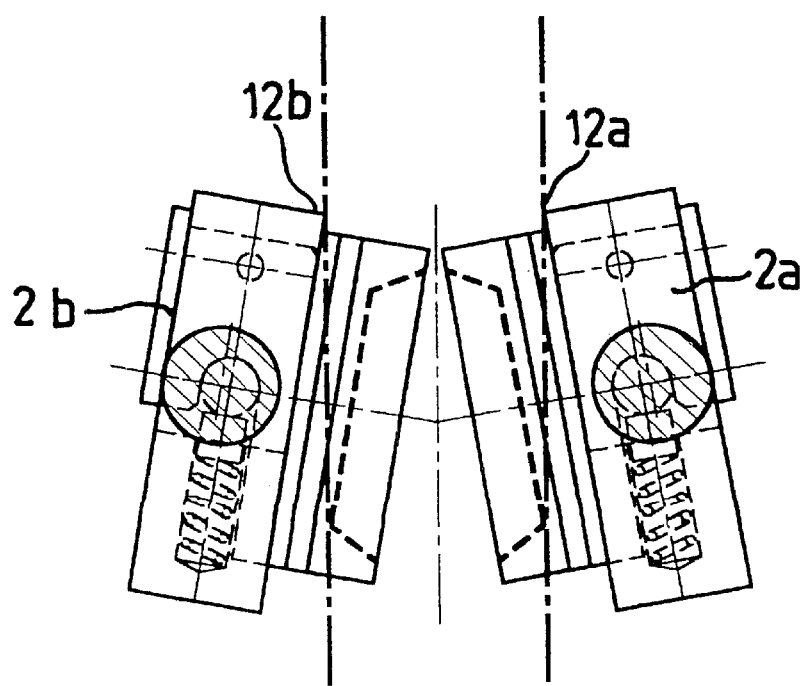
Figure 10:
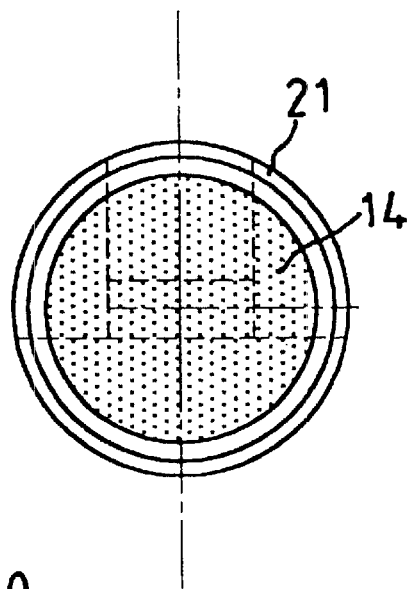
FIGS. 10 and 11 show the movable portions in a particular embodiment.
Figure 11:
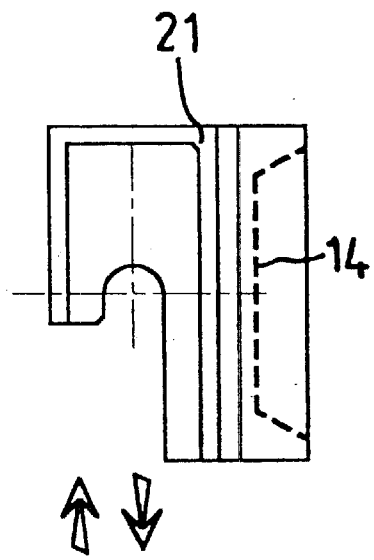

This step is shown in FIGS. 8 and 9.

Nevertheless, during this downwardly opening phase, the used small quantity 18 can be discharged. This discharge can take place by simple gravity.

A good evacuation of the used small quantity 18 can be promoted particularly by the bias of the guide means 10 holding the small quantity 18 vertical and avoiding its sticking to one or the other of the movable portions 2a, 2b. There can also be used specific means present at the level of each movable portion 2a, 2b such as ejection fingers at the level of the screen or filter.

The invention which has been described permits the passage of the extraction chamber 16 between various arrangements by means of a single motor. This motor is moreover very easy to use because it is if desired constituted by a simple electric motor. Any utilization of jacks or other purely translatory means is avoided. Moreover, the sequencing of the phases is simplified because only one or two position detectors permit detecting the opening and closing phases of the extraction chamber 16 as a function of the angular rotation carried out.

REFERENCES

1. Device
2a. Movable portion
2b. Movable portion
3a. Eccentric shaft
3b. Eccentric shaft
4. Framework
5. Braked pivotal connection
6a. Toothed wheel
6b. Toothed wheel
7. Gearing
8. Motor
9. Contact plane
10. Guide means
11. Groove
12a. Abutment surface
12b. Abutment surface
13. Water inlet
14. Screen
15. Recess
16. Extraction chamber
17. Coffee outlet
18. Small quantity
19. Presence detector
20. Movable support
21. Screen door
22. Pressure means
23. Friction pad
24. Spring
25. Spring cage

What is claimed is:

1. A device for extracting coffee, which comprises:
   an extraction chamber supplied vertically by the introduction of tablets or a premeasured small quantity of ground coffee;
   said extraction chamber comprising two movable portions that are horizontally moveable so as to move toward or away from each other;
   one of the moveable portions comprising a hot water inlet, the other movable portion including a coffee extract outlet;
   said moveable portions being each mounted on an eccentric shaft adapted to transmit to said moveable portions oscillatory movements in opposite directions; and
   a braked pivotal connection between each eccentric shaft and each movable portion, so as to combine the horizontal movement and oscillatory movement for sequencing opening and closing phases of the extraction chamber.

2. The device according to claim 1, further comprising abutment surfaces on which the moveable portions come to bear, permitting limiting their angle of oscillation.

3. The device according to claim 1, further comprising guide means for guiding the small quantity and for holding the small quantity substantially in a vertical position.

4. The device according to claim 3, wherein the guide means also constitute the abutment surfaces.

5. The device according to claim 3, wherein the guide means comprise two vertically grooved elements to coact with the periphery of the small quantity and positioned on opposite sides of the moveable portions substantially at the level of a mutual plane of contact.

6. The device according to claim 1, wherein the pivotal connection is braked by a friction pad carried by each movable portion and bearing resiliently on the periphery of the eccentric shaft.

7. The device according to claim 2, wherein the abutment surfaces effect a limitation on the relative movement of the movable portions/eccentric shaft of the braked pivotal connection so as to bring together the moveable portions when they have reached their maximum angular displacement.

8. The device according to claim 1, wherein the eccentric shafts are moved by power driven toothed wheels engaging with each other and adapted to transmit to the moveable portions symmetrical movements relative to a mutual plane of contact.

9. The device according to claim 1, wherein the moveable portions each comprise a moveable support mounted on the eccentric shaft, one comprising a screen door, the other a filter door, which are retractable and mounted on the moveable support.

10. The device according to claim 8, further comprising at least one position detector adapted to determine the angular position of the toothed wheels.

11. The device according to claim 3, further comprising at least one detector for detecting the presence of a tablet in a loading position.

12. The device according to claim 1, wherein:

starting from a maximum angular position in which the extraction chamber is downwardly open, the eccentric shafts undergo an angular displacement permitting opening the extraction chamber upwardly for introduction of a small quantity;

the eccentric shafts continue their angular displacement to close the extraction chamber, and the eccentric shafts then carry out an angular displacement in an opposite direction to bring the extraction chamber to a downwardly open position to discharge the used small quantity and to await the loading of a new small quantity.

* * * * *